(12) United States Patent
Ricotti et al.

(10) Patent No.: US 11,660,920 B2
(45) Date of Patent: May 30, 2023

(54) MULTI-ENVIRONMENT FLEXIBLE VEHICLE

(71) Applicant: STMICROELECTRONICS S.R.L., Agrate Brianza (IT)

(72) Inventors: Giulio Ricotti, Broni (IT); Alessandro Nicolosi, Dresano (IT); Juri Giovannone, Cernobbio (IT); Francesco D'Angelo, Giussago (IT); Stefano Corona, Borgarello (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 1070 days.

(21) Appl. No.: 16/269,415

(22) Filed: Feb. 6, 2019

(65) Prior Publication Data
US 2019/0263206 A1    Aug. 29, 2019

Related U.S. Application Data

(60) Provisional application No. 62/636,696, filed on Feb. 28, 2018.

(51) Int. Cl.
| | |
|---|---|
| *B60F 5/02* | (2006.01) |
| *B60F 3/00* | (2006.01) |
| *B64C 37/00* | (2006.01) |
| *B60F 5/00* | (2006.01) |
| *B63G 8/00* | (2006.01) |
| *B64C 39/02* | (2023.01) |

(52) U.S. Cl.
CPC .............. *B60F 5/02* (2013.01); *B60F 3/0007* (2013.01); *B60F 5/006* (2013.01); *B63G 8/001* (2013.01); *B64C 37/00* (2013.01); *B64C 39/024* (2013.01); *B63G 2008/002* (2013.01); *B64U 2201/20* (2023.01)

(58) Field of Classification Search
CPC .......... B60F 5/02; B60F 5/003; B60F 3/0007; B64C 37/00
USPC .............................................. 701/2
See application file for complete search history.

(56) References Cited

U.S. PATENT DOCUMENTS

| | | | |
|---|---|---|---|
| 2,557,894 A | * | 6/1951 | Siesel ................ B64C 37/00 244/50 |
| 3,029,042 A | | 4/1962 | Martin |
| 4,579,297 A | | 4/1986 | Ayoola |
| 4,899,954 A | | 2/1990 | Pruszenski, Jr. |

(Continued)

FOREIGN PATENT DOCUMENTS

| | | | | |
|---|---|---|---|---|
| CN | 103895860 A | | 7/2014 | |
| CN | 105711824 A | * | 6/2016 | ............. A63H 23/14 |

(Continued)

*Primary Examiner* — Christopher P Ellis
(74) *Attorney, Agent, or Firm* — Seed Intellectual Property Law Group LLP

(57) ABSTRACT

The current technique provides an unmanned vehicle that is capable of travelling in the air, on the ground and/or in the water. The driving force of the unmanned vehicle is provided by at least one propelling module that includes a motor, a shaft and a propeller. The propelling module is coupled to a chassis. The chassis includes one or more support elements that each couples to one or more aileron member. An aileron member is configured to tilt with or about the support element to change fluid flux about the aileron member and thus change a position of the propelling force.

20 Claims, 7 Drawing Sheets

(56) References Cited

U.S. PATENT DOCUMENTS

| | | | |
|---|---|---|---|
| 9,061,558 B2 * | 6/2015 | Kalantari | B60F 5/02 |
| 9,145,207 B2 * | 9/2015 | Moschetta | B64C 39/028 |
| 10,384,772 B2 * | 8/2019 | Yamada | B64C 25/36 |
| 10,759,531 B2 * | 9/2020 | Yamada | B64C 39/022 |
| 10,988,241 B2 * | 4/2021 | Santangelo | B64C 27/006 |
| 11,142,314 B2 * | 10/2021 | Hada | B64C 39/022 |
| 2008/0251308 A1 | 10/2008 | Molmar et al. | |
| 2010/0193626 A1 | 8/2010 | Goossen et al. | |
| 2011/0139923 A1 | 6/2011 | Papanikolopoulos et al. | |
| 2011/0226174 A1 | 9/2011 | Parks | |
| 2011/0315806 A1 | 12/2011 | Piasecki et al. | |
| 2013/0068876 A1 | 3/2013 | Radu | |
| 2014/0061376 A1 | 3/2014 | Fisher et al. | |
| 2014/0131507 A1 * | 5/2014 | Kalantari | B60F 5/02 244/2 |
| 2014/0319266 A1 | 10/2014 | Moschetta et al. | |
| 2015/0028150 A1 | 1/2015 | Klein | |
| 2015/0266576 A1 | 9/2015 | Hobbart et al. | |
| 2015/0274291 A1 | 10/2015 | Vetter | |
| 2016/0009381 A1 | 1/2016 | Benatar et al. | |
| 2016/0122015 A1 | 5/2016 | Hutson | |
| 2016/0130000 A1 | 5/2016 | Rimanelli | |
| 2016/0257400 A1 | 9/2016 | Olm et al. | |
| 2016/0376000 A1 | 12/2016 | Kohstall | |
| 2017/0029106 A1 | 2/2017 | Chang et al. | |
| 2020/0017209 A1 * | 1/2020 | Lacaze | B64D 27/26 |
| 2020/0172234 A1 * | 6/2020 | Neff | B64C 29/0033 |
| 2021/0300546 A1 * | 9/2021 | Kisly | B64C 3/385 |
| 2022/0250739 A1 * | 8/2022 | Rimanelli | B64C 17/02 |

FOREIGN PATENT DOCUMENTS

| | | | | |
|---|---|---|---|---|
| CN | 107685605 A | * | 2/2018 | |
| CN | 107839419 A | * | 3/2018 | |
| CN | 108583182 A | * | 9/2018 | B60F 5/02 |
| CN | 108819631 A | * | 11/2018 | B60F 3/0007 |
| CN | 110281719 B | * | 3/2021 | B60F 5/02 |
| CN | 112498035 A | * | 3/2021 | B60F 5/02 |
| CN | 109968931 B | * | 9/2021 | |
| CN | 113879058 A | * | 1/2022 | |
| CN | 113955102 A | * | 1/2022 | |
| CN | 114475114 A | * | 5/2022 | B60F 5/02 |
| DE | 212019000113 U1 | * | 5/2020 | |
| KR | 101845416 B1 | * | 6/2006 | |
| KR | 20180012136 A | * | 7/2020 | |
| RU | 2770718 C1 | * | 6/2020 | |
| WO | 2006/066561 A1 | | 6/2006 | |
| WO | 2011/131733 A2 | | 10/2011 | |
| WO | 2011/149544 A1 | | 12/2011 | |
| WO | 2014/067563 A1 | | 5/2014 | |
| WO | WO-2015072548 A1 | * | 5/2015 | B64C 37/00 |
| WO | WO-2015149000 A1 | * | 10/2015 | B64C 1/30 |
| WO | 2015/179624 A1 | | 11/2015 | |
| WO | 2016/069169 A1 | | 5/2016 | |
| WO | WO-2016066848 A1 | * | 5/2016 | B64C 29/0016 |
| WO | 2016/164416 A1 | | 10/2016 | |
| WO | 2016/195320 A1 | | 12/2016 | |

* cited by examiner

MULTI-ENVIRONMENT FLEXIBLE VEHICLE

BACKGROUND

Technical Field

The present disclosure relates generally to an unmanned vehicle and more specifically to an unmanned vehicle capable of travelling in multiple different environment domains including one or more of in the air, in the water or on the ground.

Description of the Related Art

Drones become a popular subject of researches and product development due to its recent market success and the wide use in various application scenarios. With the concepts of internet of things (IOT) and connected home, the applications of drones are further extended. Conventional drones comprise a drone body and a plurality of propulsion units mounted at various portions of the drone body. The propulsion units are separately driven by the respective motor and separately controlled to tilt the relevant driving force direction such that the drone is piloted in the desired direction, attitude and speed.

BRIEF SUMMARY

The current technique provides an unmanned vehicle that is capable of travelling in the air, on the ground and/or in the water. The driving force of the unmanned vehicle is provided by at least one propelling module that includes a motor, a shaft and a propeller. The propelling module is coupled to a chassis. The chassis includes one or more support elements that each couples to one or more aileron member. An aileron member is configured to tilt with or about the support element to change fluid flux about the aileron member.

The unmanned vehicle also includes at least two wheels, i.e., a pair of wheels, coupled to the chassis in a manner that the wheels rotate freely relative to the chassis. That is, the wheels freely rotate as the chassis is driven by the propelling force of the propelling module and the wheels are not driven by a driveshaft, namely, there is no torque connection between a motor and a wheel. In an example, a pair of wheels are coupled through a cross bar, e.g., a shaft. The shaft may be part of the structure element or may be coupled to the chassis through a cylindrical shell element. The wheels may also provide weights to help maintain a balance of the unmanned vehicle.

In an example, the wheels may be structured to float on a fluid interface, e.g., on water, so the wheels can keep the vehicle afloat in the water.

In an example, the propelling module and the support element(s) of the aileron members are fixed to the chassis such that the propelling module, the support elements and the chassis move together. Specifically, in an embodiment, the tilting of one or more of the aileron members changes a position of the propelling module relative to a current movement path of the unmanned vehicle. The position change may be in a horizontal plane, a vertical plane and/or any other planes within a three-dimensional sphere.

As the propelling module provides driving force for the unmanned vehicle, the position of the propelling module dictates a movement trajectory of the unmanned vehicle. For example, in order to ride on a solid surface, the propelling module tilts to make the shaft to have a small angle or substantially in parallel with the solid surface such that a horizontal vectorial component of the aerodynamic force is generated by the rotating propeller (propelling force) to provide a horizontal acceleration and speed. In order for the unmanned vehicle to fly in the air, the propelling module may be titled such that the shaft has a larger angle with respect to the ground surface to generate a sufficiently large vertical vectorial component of the aerodynamic force to lift the unmanned vehicle into the air.

BRIEF DESCRIPTION OF THE SEVERAL VIEWS OF THE DRAWINGS

The foregoing and other purposes, features, aspects and advantages of embodiments of the present disclosure will become apparent from the following detailed description of embodiments, given by way of illustration and not limitation with reference to the accompanying drawings, in which.

DETAILED DESCRIPTION

Throughout the following description, only those elements useful for an understanding of the various embodiments of the unmanned vehicle will be described in detail. Other aspects, such as the particular mechanical mechanisms to assemble the components of the unmanned vehicle together and/or the particular air fluid flux mechanisms, that are not required for an understanding of the disclosure have not been described in detail, and shall not limit the scope of the disclosure.

Figure 1:
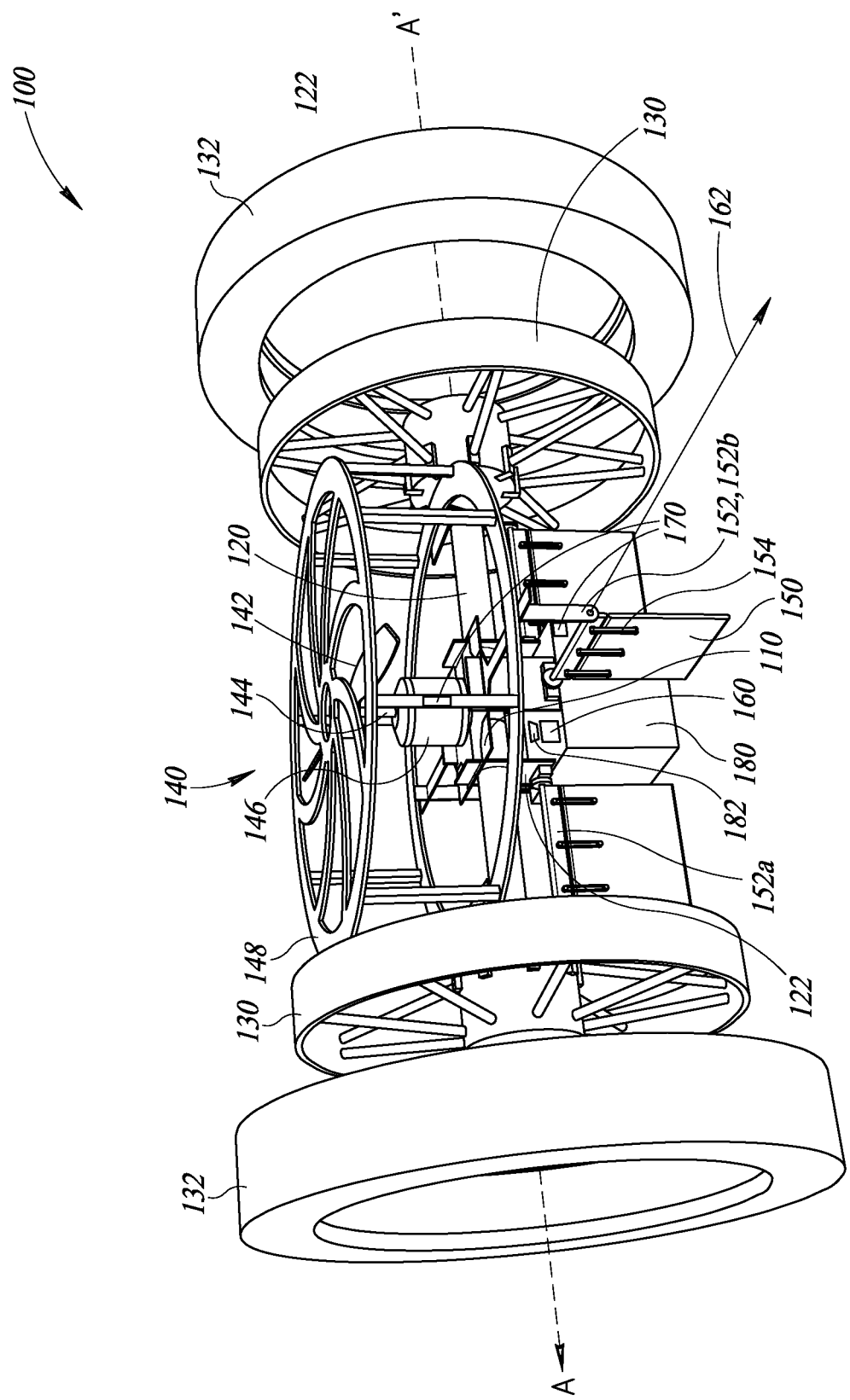
FIG. 1 illustrates an example unmanned vehicle according to the disclosure.

FIG. 1 illustrates an example unmanned vehicle 100. Referring to FIG. 1, unmanned vehicle 100 includes a chassis 110 coupled to a cross bar 120. The chassis 110 can be any acceptable frame, base, casing or other support members to which the various components connect. In an embodiment, the chassis 110 is rigidly coupled to the cross bar 120, e.g., fixed together through soldering or other physical force. In another embodiment, the chassis 110 is coupled to the cross bar 120 in a rotatable manner, namely the chassis 110 is arranged to rotate about the cross bar 120, e.g., through a cylinder element like a bearing (not shown for simplicity). As described herein, the chassis 110 may rotate about or with the cross bar 120 through one or more of a fluid flux change or a suitable mechanical link like a crane train element (not shown for simplicity). As shown in FIG. 1, as an illustrative example, the cross bar 120 is coupled to the chassis 110 through multiple coupling structures 122. The coupling structures 122 can be housing, plates, a frame or other structural support member. As the chassis 110 and the crossbar 120 are coupled together, the two may be taken as an integrated chassis, namely the cross bar 120 may be an integrated portion of the chassis 110.

Wheels 130 are coupled to the chassis 110 through the cross bar 120 in a manner that each of wheels 130 may rotate freely with respect to the chassis 110, e.g., about the chassis 110 as shown in FIG. 1 as an illustrative example. A wheel 130 rotates freely with respect to the chassis 110 in the sense that the wheel 130 is not driven by a driveshaft and there is no torque connection between a motor and the wheel 130.

In an example, the wheels 130 may be structured to float on a fluid surface. For example, the wheels 130 each may include at least one of a low density material tire portion 132, an inner tube that can be inflated or tire 132 can be connected to wheel 130 with an air tight seal so that tires are tubeless and full of air. The wheels 130 can include a rim and separate tire or they can be unitary rim and tire combined as a single piece. In the combined rim and tire, the tire will likely not be inflated with air but will instead likely be a polymer or foam material that is sufficiently rigid to be a tire but have a low enough density to float in water.

With the wheels 130 being floatable and with proper configuration of the size of the wheels 130 with respect to other components of the unmanned vehicle 100, including the chassis 110, propelling module 140 (further described herein later), and moveable members 150 (further described herein later), the unmanned vehicle 100 may be able to float and travel on or through a fluid surface, e.g., travel through water.

FIG. 1 shows that unmanned vehicle includes one cross bar 120 and two wheels 130, namely one pair of wheels 130, coupled to chassis 110 through cross bar 120. The wheels 130 may each be independently freely coupled to cross bar 120 or may be linked together through a shaft, which is coupled to cross bar 120 through, e.g., bearing elements. That is, cross bar 120 may be a cylindrical shell element and may include a hollow portion for a shaft to couple through.

A propelling module 140 may be rigidly coupled, e.g., fixed, to chassis 110. Propelling module 140 may include a propeller 142, a shaft 144 and a motor 146. In an example, shaft 144 is arranged substantially perpendicular to an axis A-A' between a pair of wheels 130 such that a driving force from propeller 142 may include a horizontal vectorial component ("horizontal driving force") pushing or pulling wheels 130 to rotate freely without a driveshaft. As described herein, to generate the horizontal driving force, an angle between shaft 144 and a horizontal plane needs to be properly adjusted. For example, when shaft 144 is plumb, there is not horizontal driving force from propeller 142 with respect to a level ground surface. Thus, when the shaft 144 is plumb, namely in a vertical upright orientation, the propeller 142 will exert a force to lift the vehicle off the ground rather than more it horizontal with respect to the ground.

In an example, as shown in FIG. 1, some or all components of propelling module 140 may be at least partially enclosed within a frame 148 for one or more of structural or air flux modulation considerations. In an example, frame 148 may include a cage like structure as shown in FIG. 1. Frame 148 may also function as a base for other components, like sensors, to be coupled with. Frame 148 may be fixed to chassis 110 directly or indirectly.

Multiple moveable members (or "aileron member") 150 are coupled to chassis 110 through support element 152 and flexible coupling element 154. In an embodiment, as shown in FIG. 1, at least one support elements 152, shown as support elements 152a, may be arrange substantially in parallel with axis A-A' between a pair of wheels 130, and at least another support elements 152, shown as support element 152b, may be arranged substantially perpendicular to axis A-A' between the pair of wheels 130. In an embodiment, the flexible coupling element 154 may be elastic hinges that are configured to bend freely when in contact with a foreign object, e.g., an obstacle on a movement path of the unmanned vehicle 100.

In an embodiment, support element 152 of moveable members 150 may be coupled to frame 148 in a suitable manner.

In an embodiment, a support element 152 may be configured to rotate about its longitudinal axis 162 driven by a mini-motor (not shown for simplicity), e.g., a brushless DC motor, coupled to the chassis 110. The rotation of a support element 152 may cause the respective moveable member(s) 150 to tilt, which may include to flip, bend or otherwise change their angle to cause fluid flow, whether air or water, about the moveable member 150 to be modulated. In an embodiment, the support element 152, the chassis 110 and the propelling module 140 are rigidly coupled together, e.g., fixed together, such that the propelling module 140, the support element 152 and the chassis 110 move together as a whole. As such, the tilting of one or more moveable member(s) 150 may change a position of the propeller 142 relative to a current movement path of the unmanned vehicle 100.

Figure 2A:
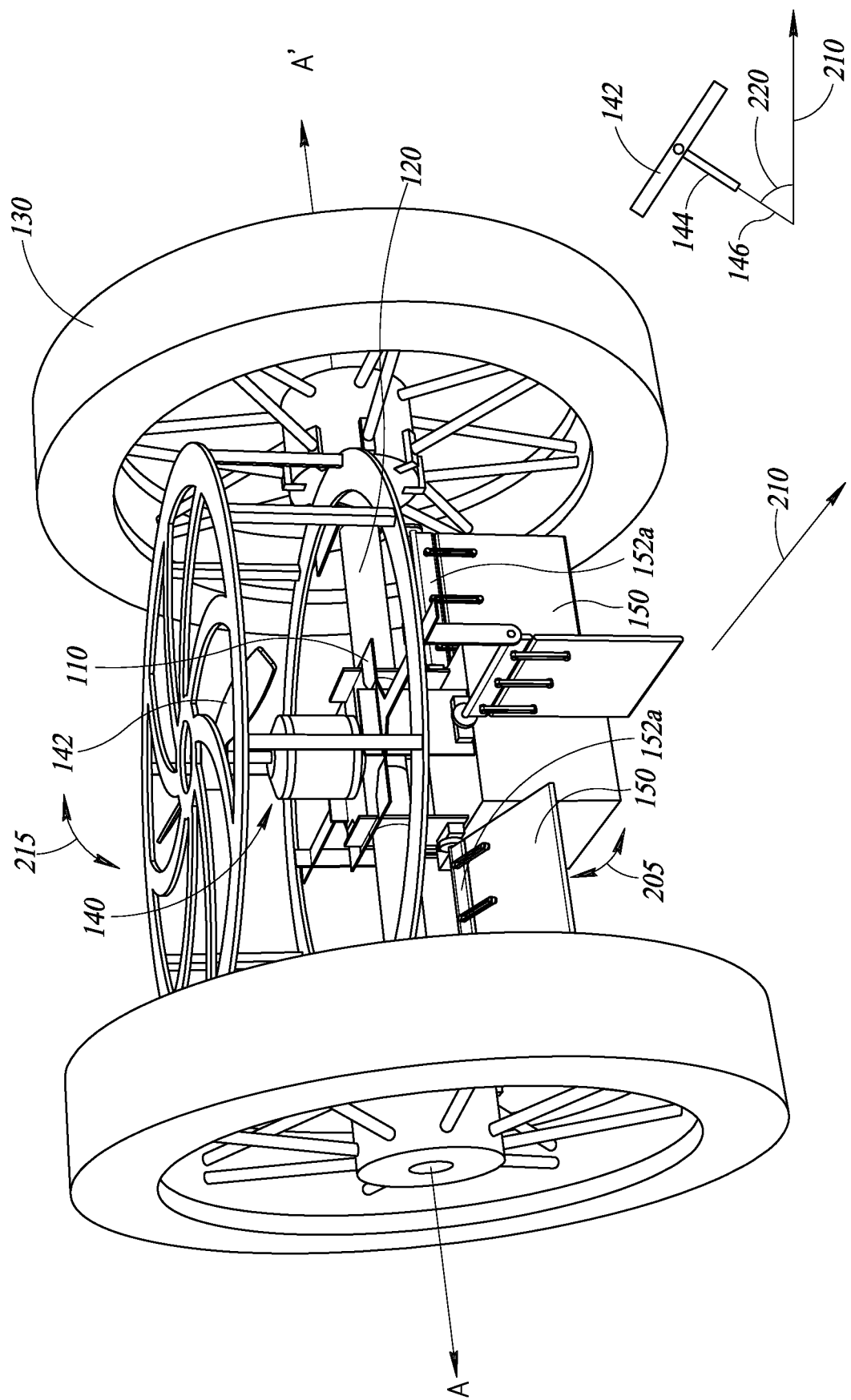
FIGS. 2A and 2B illustrate examples of propelling module changing position relative to a current movement path according to the disclosure.
Figure 2B:
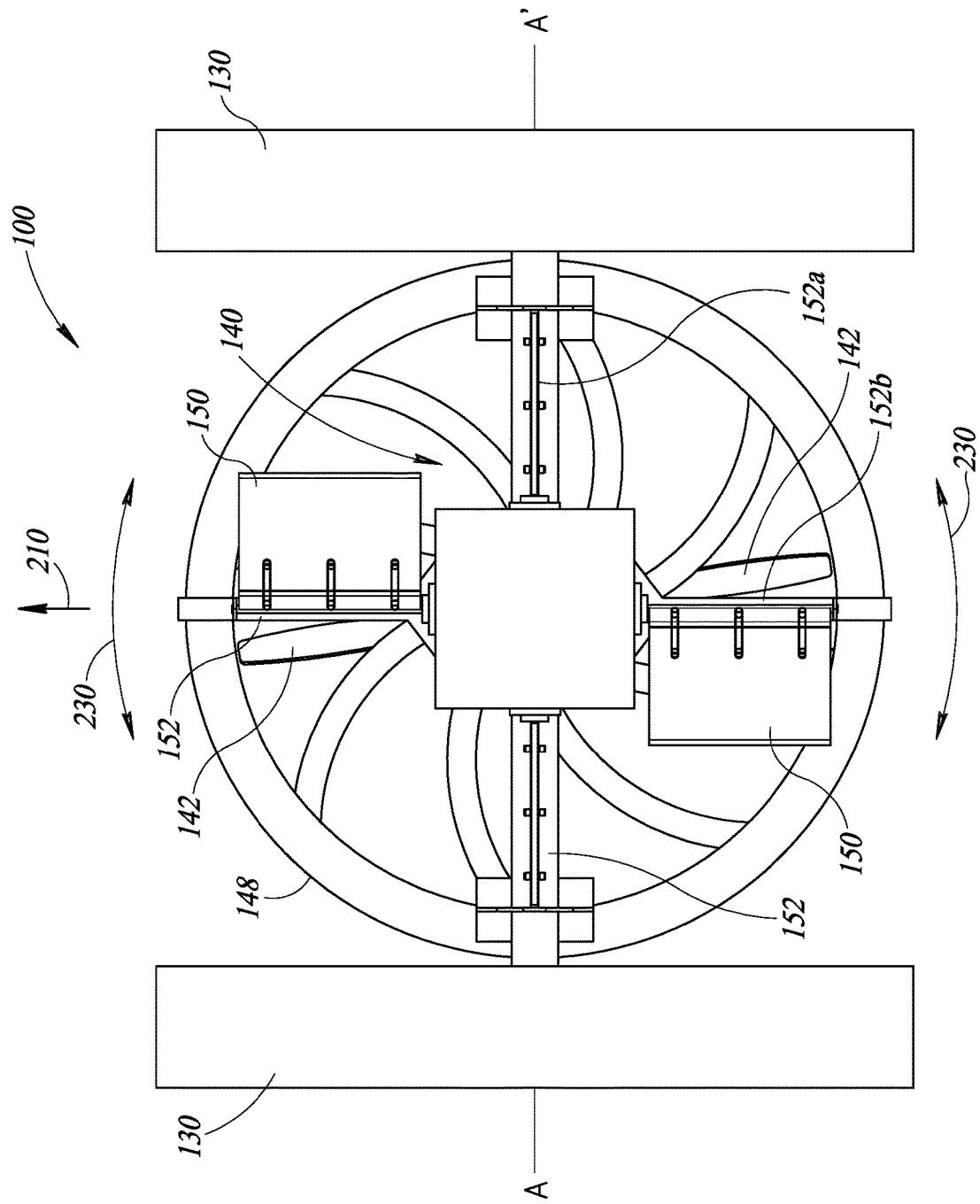

FIG. 2A and 2B illustrate examples of one or more moveable member 150 tilting. Referring to FIG. 2A, rotation of support elements 152a, which are parallel to axis A-A' between a pair of wheels 130, may move the respective moveable members 150 to tilt forward or backward, 205, relative to a current movement path 210 of the unmanned vehicle 100, which in turn may be translated into the forward or backward tilting, 215, of the propeller 142 with respect to the current movement path 210, reflected through an angle 220 between the shaft 144 and the current movement path 210.

"Current movement path" 210 refers to a movement path of the unmanned vehicle 100 immediately before a tilting movement of a moveable member 150.

Referring to FIG. 2B, which shows a bottom view of the unmanned vehicle 100. As shown in FIG. 2B, rotation of support elements 152b, which are substantially perpendicular to the axis A-A' between the pair of wheels 130, may bring the respective moveable members 150 to tilt, 230, to the right or to the left relative to the current movement path 210 of the unmanned vehicle 100, which in turn may be translated into left turn or right turn of the unmanned vehicle 100 relative to the current movement path 210, and thus the propeller 142 also changes position to the left or to the right relative to current movement path 210. Since the propelling module 140 is rigidly coupled to the chassis, when the moveable members 150 tilt, then the entire chassis with move and change its orientation. The chassis may rotate, move forward, backward, rotate about axis A-A' or make other movements, depending on the tilt of the moveable members 150. The change of the angle of the chassis and propelling module 140 will change the direction that the force is applied to the unmanned vehicle 100. The unmanned vehicle therefore does not have steering wheels or a steering mechanism for changing the angle or direction of the wheels. Instead, the direction in which the force from propelling module 140 is applied will change as the movable members 150 tilt, thus causing the propelling module 140 to change the movement path 210.

Referring to FIGS. 1, 2A and 2B together, it is shown, as an illustrative example, that two moveable members 150 are arranged in parallel to the axis A-A' between the pair of wheels 130, and two moveable members 150 are arranged perpendicular to the axis A-A'. These specific arrangements are not limiting, and other numbers of moveable members 150 are also possible. For example, there may be only one moveable member 150 arranged in parallel to the axis A-A' and there may be more than two moveable members 150 arranged perpendicular to the axis A-A'.

The axis A-A' may be an actual axis, e.g., a shaft, connecting two wheels 130, or may be a conceptual axis line that exists but is not embodied in a single axis structure.

In an embodiment, as shown in FIG. 1, moveable members 150 are each configured as a single panel capable of moving with a rotating support element 152, which is not limiting. In other embodiments, moveable members 150 may be a moveable surface portion coupled in some manner to chassis 110. For example, a moveable member 150 may be a moveable surface portion of a larger panel, e.g., a wing structure. In multiple embodiments, moveable members 150 in an unmanned vehicle 100 may include different structural configurations among one another. Due to its function to adjust fluid flux, a moveable member 150 is also referred to as an aileron member. However, it should be appreciated that an aileron member 150 of the unmanned vehicle 100 does not necessarily have a same or similar structural configuration as an aileron found in an airplane.

In an embodiment, as shown in FIG. 1, unmanned vehicle 100 include only one pair of wheels 130, and the chassis 110, the propelling module 140 and the moveable members 150 is configured to tilt about the axis A-A' between the pair of wheels 130.

Figure 3:
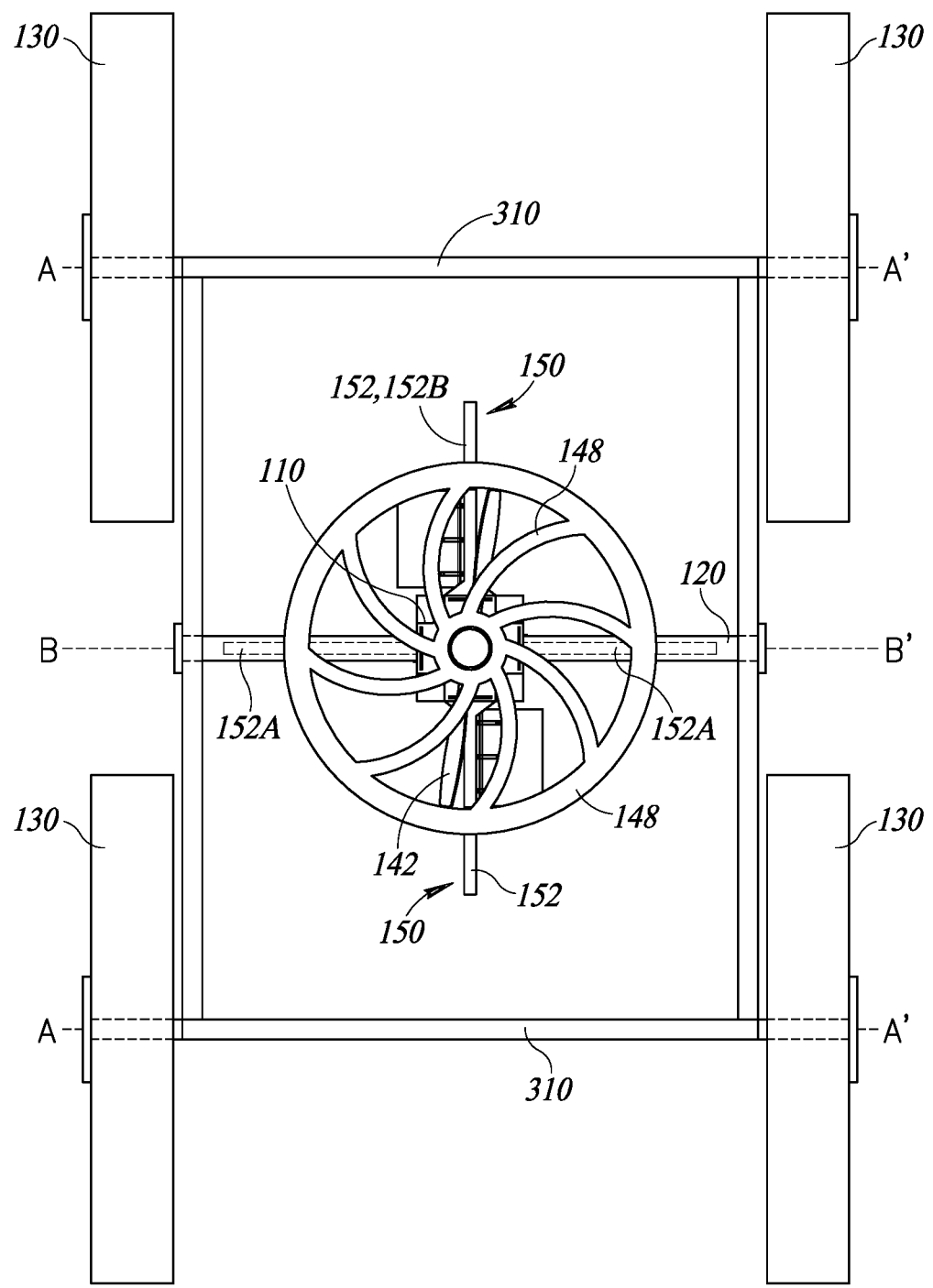
FIG. 3 illustrates another example unmanned vehicle according to the disclosure.

Referring now to FIG. 3, in another embodiment, an example unmanned vehicle 100 may include four or more wheels 130 that are coupled to chassis 110 through a platform 310. In an embodiment, each pair of the wheels 130 are configured to rotate freely about the respective axis A-A' between the two wheels 130 of the pair. The multiple axes A-A' between the multiple pairs of wheels 130 may be substantially parallel to one another.

Propeller module 140 (propeller 142 shown) and moveable members 150 (support element 152 shown) are coupled to chassis 110, which is coupled to platform 310 through cross bar 120. Axis B-B' of cross bar 120 is substantially in parallel with an axis A-A' between a pair of wheels 130. Chassis 110 is coupled to platform 310 in a manner that it is capable of rotating about axis B-B' either through the cross bar 120 or through a cylindrical shell that is part of chassis 110 (not shown for simplicity) and encloses the cross bar 120.

With the tilting of moveable members 150 arranged substantially in parallel to axis B-B' (thus also substantially in parallel with axis A-A'), propeller 142 may change position relative to the platform 310 and thus a current movement path of the unmanned vehicle 100.

Referring back to FIG. 1, the unmanned vehicle 100 may also include a controller 160, a sensor suite 170 including multiple different sensors and a payload platform 180. The controller 160 and/or the sensor suite 170 may be position in/on the payload platform 180 or may be coupled/ attached to other portions of unmanned vehicle 100, e.g., the chassis 110 and/or the frame 148.

In an example, unmanned vehicle 100 may include one or more data communication ports 182 for the controller 160, the sensor suite 170 and/or other electronic components to be coupled to the electronic system thereof to control the operation of the unmanned vehicle 100 and/or to provide additional functions to the unmanned vehicle 100. For example, a data communication port or interface may be provided on the payload platform 180 for an additional component, e.g., a camera, to be coupled into the system.

Figure 4:
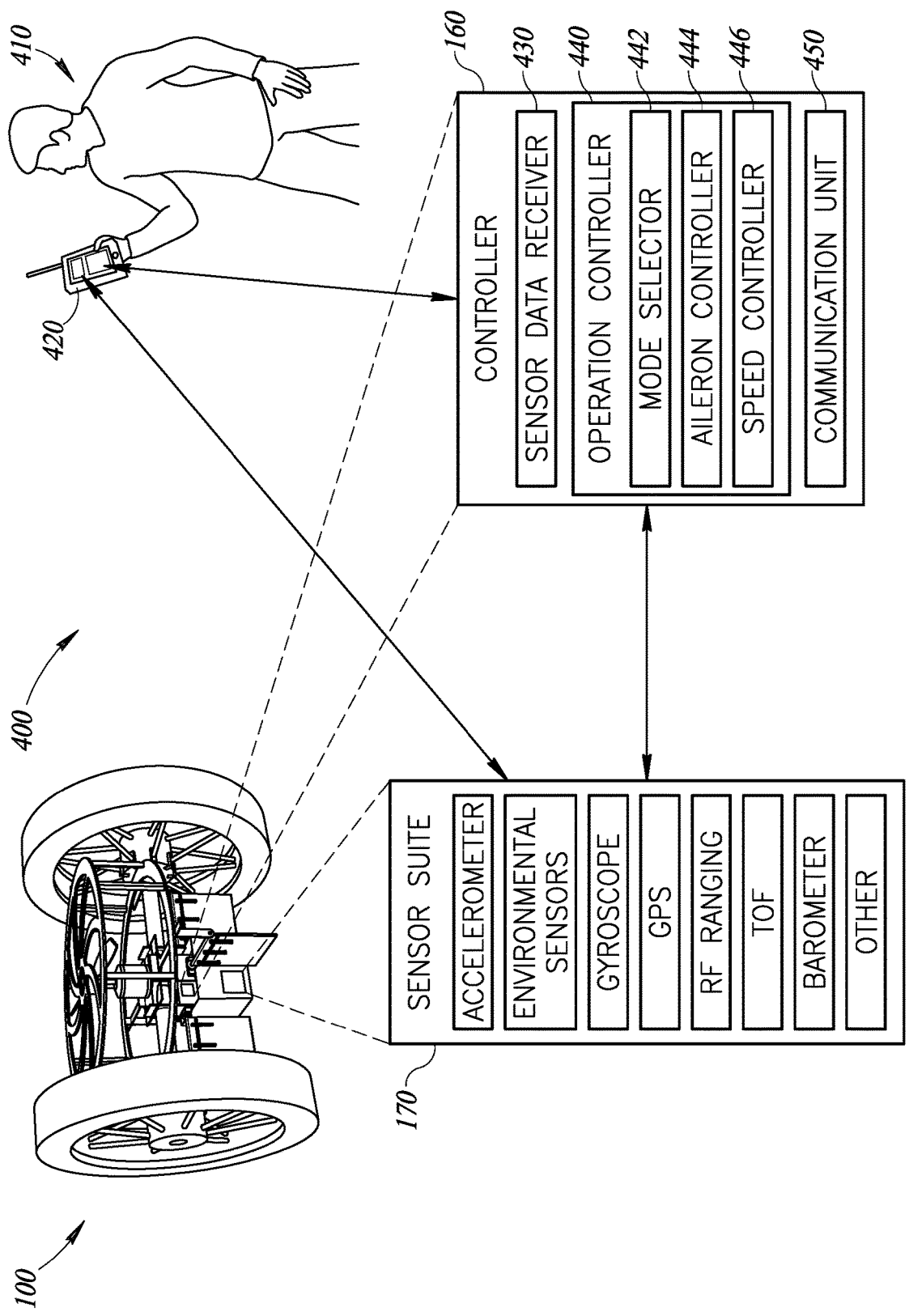
FIG. 4 illustrates an example system for controlling unmanned vehicles according to the disclosure.

FIG. 4 illustrates a system 400 for controlling an operation of unmanned vehicle 100. Referring to FIG. 4, the controller 160 may be communicatively coupled to the sensor suite 170 to receive data from the sensor suite 170. The sensor suite 170 may include one or more of accelerometer, still photo camera, infrared detector, IR camera, video camera, gyroscope, environmental sensor, barometer, GPS sensor, RF based ranging sensor, time of flight (TOF) ranging sensor, and/or other suitable sensors. Environmental sensor may include not or more of a gas sensor, a fluid sensor, or other sensors that is capable of directly detecting a traveling environment of the unmanned vehicle 100, e.g., air, fluid or ground. It should be appreciated other sensors may also be used to detect the travelling environment. It can be used to detect dangerous chemicals or gases in a hostile environment. Thus, it can be equipment with a radiation sensor, natural gas sensor, poison gas sensor, explosive fluid sensor or other dangerous chemical sensors. It can therefore be placed into a hostile environment and detect harmful conditions, whether near a nuclear waste site, a war zone, inside a nuclear reactor, or other place. As needed, it can roll, spin, fly, go through liquid, whether water, sodium or other liquid, to access places that could not previously be accessed. For example, the barometer may be used to detect an altitude of the unmanned vehicle 100. To this extend, sensor suite 170 may also include a fusion element (not shown for simplicity) that is configured to integrate the readings of multiple different sensors in suitable analysis.

Each of the sensor suite 170 and the controller 160 may communicate directly, e.g., through a wireless communication link, to a user 410 having a user device 420. For example, the controller 160 may function together with the user device 420 in controlling the operation of the unmanned vehicle 100. The user device 420 may be a dedicated control console for the unmanned vehicle 100 or an application installed in a smart device, e.g., a smart phone. For example, an application program installed on the user device 420 may function together with functional elements of the controller 160. In the description herein, all functions of the controller 160 may be performed wholly locally with a controller 160 as attached to unmanned vehicle, wholly remotely by the user device 420 in communication link with the controller 160, or partially with the controller 160 and partially with the user device 420, which are all included in the disclosure. To this extent, in the description herein, the controller 160 may include a local subsystem, e.g., a microcontroller (MCU), which is physically coupled to the unmanned vehicle 100, and a remote subsystem, e.g., an application installed on remote user device 420.

Controller 160 may include a sensor data receiver 430, an operation controller 440 and a communication unit 450. Operation controller 440 may include a mode selector 442, an aileron controller 444 and a speed controller 446. The sensor data receiver 430 may be configured to receive sensor data from the sensor suite 170. The operation controller 440 may be configured to control an operation of the unmanned vehicle 100 at least partially based on the received sensor data. Specifically, the mode selector 442 may be configured to select an operation mode/state of the unmanned vehicle 100, e.g., in the air, on the ground or in the water. The mode selector 442 may also be configured to change a position of propelling module 140 with respect to a current movement path 210 (FIG. 1) of unmanned vehicle 100, either directly or through the aileron controller 444.

The unmanned vehicle 100 can thus enter a very hazardous environment, navigate through this environment using one or more of the modes of travel that it is capable of operating with, collect data and transmit that data back to a central server. Since it is capable of travelling by air, land, liquid and other means, it can explore an entire hazarders site that previously would not accessible with a single vehicle. It can transition easily between rolling and flying very quickly and thus can easily navigate and move through and around a wide variety of terrains and obstacles. The video cameras, whether IR, UV or visual light, along with sonar and radar sensors can collect data about the surrounding environment and transmit them back to the user 410 to permit the user 410 to navigate the unmanned vehicle to desired locations across the terrain. Aileron controller 444 may be configured to control a movement of a moveable member 150, in an embodiment, based on a selected operation state. Connected to the chassis, such inside the coupling structure structures 122 can be a gearing system. This gearing system can include a rotatable connecting member between the chassis and the aileron members that permit the entire chassis to rotate when the air flux changes as the ailerons tilt. Thus, when the aileron members 150 tilt, this cases the orientation of the entire chassis to change in rotational direction. The tilting of the ailerons places a rotational torque on the chassis. This provides a moment arm about the cross bar 120 or the rest of the chassis so that the entire chassis is rotated. The rotations of the chassis causes the , propelling module 140 to rotate, which changes its orientation and thus the direction of the driving force for the vehicle. In some embodiments, the wheels 130 are not driven by a motor or gear, but rather rotate as the propelling module 140 spins, moving the vehicle by driving it air. In this case, no axis is need inside the crossbar 120 and it is hollow to provide support between the wheels.

Speed controller 446 may be configured to control a speed of the propeller 142, in an embodiment, based on a selected operation state.

Communication unit 450 may be configured to enable a communication between and among the local subsystem of controller 160, i.e., coupled with unmanned vehicle 100, the remote subsystem of controller 160, i.e., with user device 420, and sensor suite 170.

Figure 5:
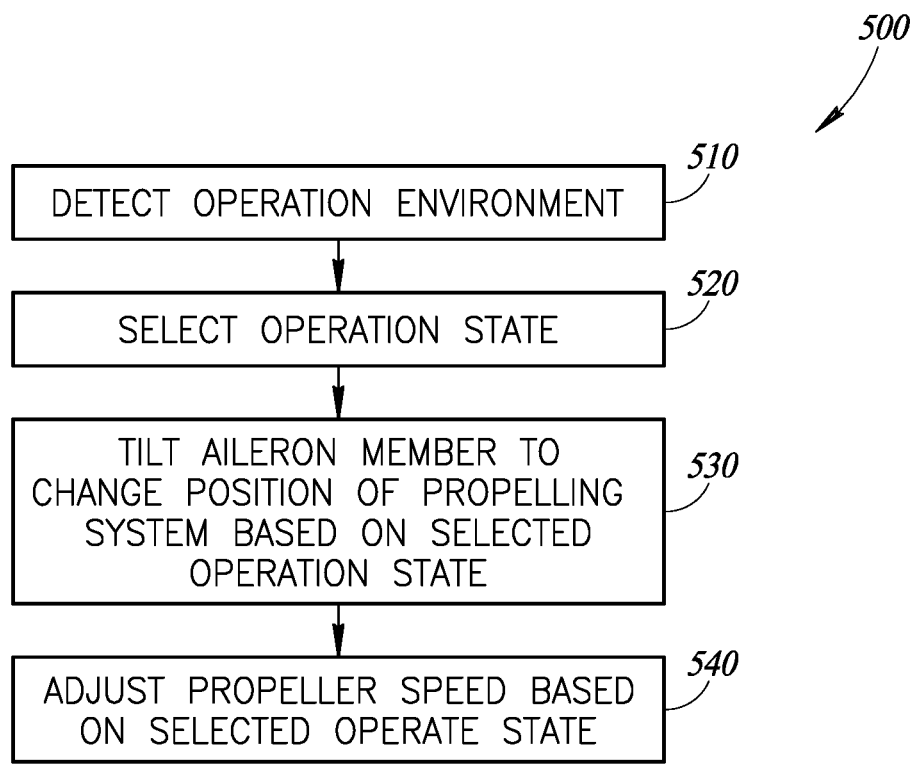
FIG. 5 disclosure an example operation process of the example system of FIG. 4 according to the disclosure.

FIG. 5 illustrates an example operation process of system 400. Referring to FIG. 5, in example operation 510, the sensor suite 170 may detect an operation environment of the unmanned vehicle 100. The operation environment may include, but not limited to, whether the unmanned vehicle 100 travels in the air, on the ground or in the water, a surrounding of the movement path, e.g., whether there is an obstacle on the movement path, a location of the unmanned vehicle 100, e.g., an outdoor location detected by GPS or an indoor location detected by RF ranging sensor and/or wireless communication signal strength, and/or a route of the movement. For example, a gyroscope and/or a barometer in the sensor suite 170 may detect that unmanned vehicle 100 flies in the air. An accelerometer in the sensor suite 170 may detect an acceleration rate or a speed of the unmanned vehicle 100. A TOF ranging sensor may detect an obstacle on the movement path, etc.

In example operation 520, the mode selector 442 may select an operation state of the unmanned vehicle 100 based at least partially on the detected operation environment. In an embodiment, the mode selector 442 may choose ground travelling as a default operation state. That is, a ground travelling mode is preferred over a flying mode and a floating mode as long as the detected operation environment allows. As long as the operation environment allows, the unmanned vehicle 100 may be controlled to travel on the ground, namely the propeller 142 is maintained at a position suitable for ground travelling. When ground travelling is not allowed, e.g., due to an obstacle on the ground or due to re-routing, mode selector 442 may choose to take either the flying mode or the floating mode for the unmanned vehicle 100.

The operation state may also include other operation parameters of unmanned vehicle 100, like speed, altitude of flying, acceleration, deceleration, turning, inclining, declining, etc.

Figure 6A:
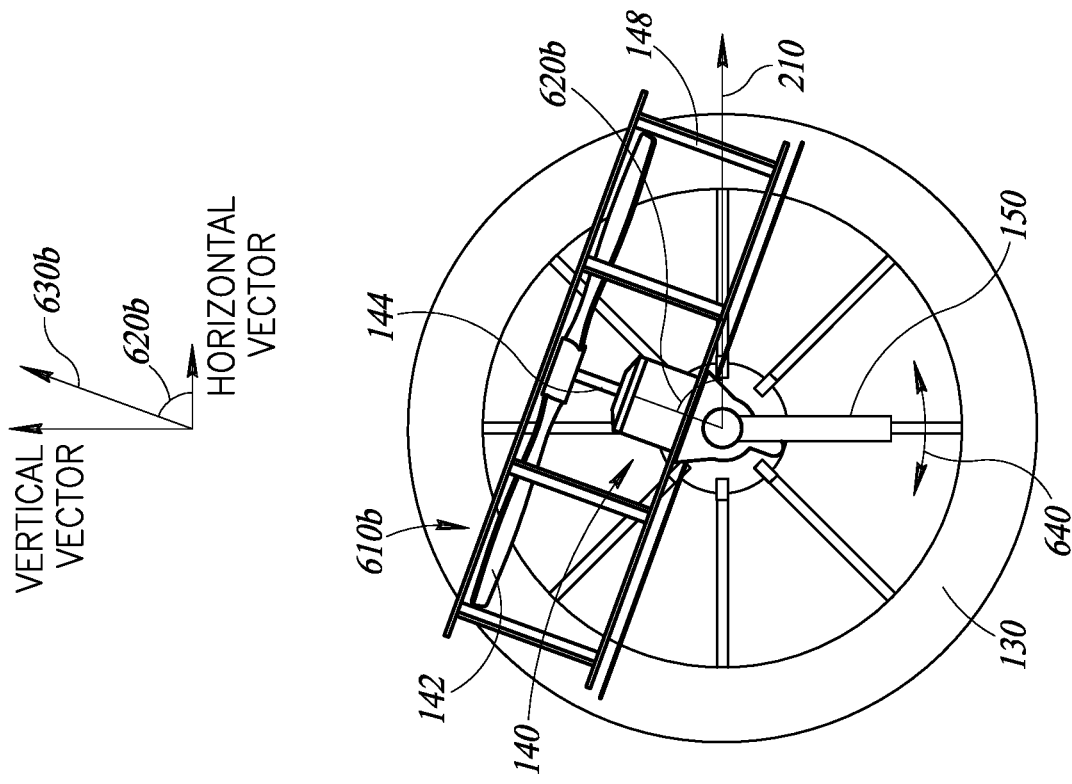
FIGS. 6A and 6B illustrate positions of propelling module for different operation states of unmanned vehicles according to the disclosure.
Figure 6B:
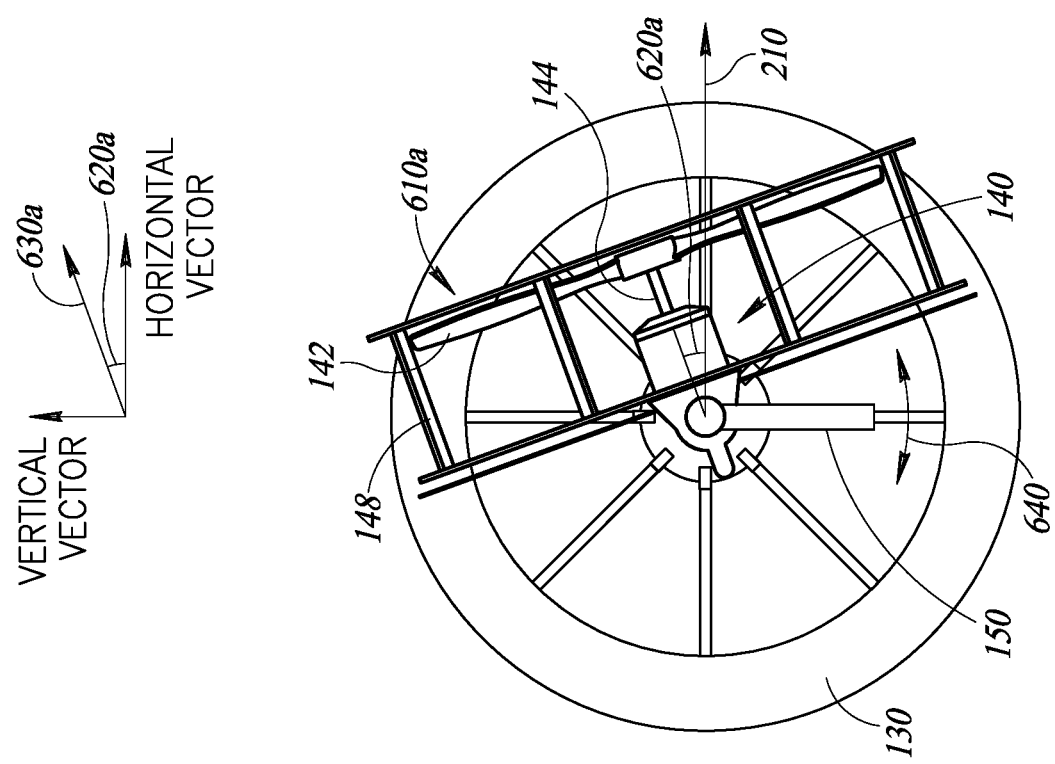

In example operation 530, aileron controller 446 may control to title one or more aileron member 150 to change a position of propelling module 140 relative to a current movement path 210 based on the selected operation state. For example, if the current movement path is on the ground, the propeller 142 may be position to generate a large horizontal vectorial force to push the unmanned vehicle to travel on the ground and a relatively smaller vertical vectorial force, if any, that is able to reduce the ground friction but is not sufficiently large to lift the unmanned vehicle 100 off the ground. As shown in FIG. 6A, with a position 610a of propelling module 140, shaft 144 have a very small angle 620a with a horizontal surface 210 (the current movement path), e.g., less than 30 degree, such that the horizontal vectorial component of the propelling force 630a is much larger than the vertical vectorial component, which is suitable for ground travelling. If then an obstacle is detected on the road and a flying mode is selected to lift the unmanned vehicle 100 over the obstacle, aileron controller 444 may tilt, 640, the aileron members 150 arranged substantially in parallel to axis A-A' such that the propeller 142 is tilted to a position 610b (FIG. 6B) suitable for the unmanned vehicle to take off. Referring to FIG. 6B, at a position 610b, shaft 144 has a much larger angle 620b with respect to the horizontal surface 210. Therefore, the vertical vectorial component of propelling force 630b is much larger than that of propelling force 630a, which facilitates a lifting force to make the unmanned vehicle 100 take off from the ground.

Referring back to FIG. 5, in example operation 540, speed controller 446 may control to adjust a rotation speed of propeller 142 based on the selected operation state. For example, compared to a flying mode, speed controller 446 may lower the propeller 142 speed when the unmanned vehicle 100, is on ground travelling mode so that the propelling force is lowered and thus the vertical vectorial component is not sufficiently large to lift the unmanned vehicle 100, off the ground.

User 410 may also provide inputs through user device 420 to direct the operation of the unmanned vehicle 100.

Having thus described at least one illustrative embodiment of the disclosure, various alterations, modifications and improvements will readily occur to those skilled in the art. Such alterations, modifications, and improvements are intended to be part of this disclosure, and are intended to be within the spirit and the scope of the present disclosure. Accordingly, the foregoing description is by way of example only and is not intended to be limiting.

In an example, one or more of local subsystem or remote subsystem of controller 160 may be implemented through a microcontroller (MCU) and/or an application processor (AP). A MCU may include one or more processor core and one or more dedicated (embedded) and/or external/shared memories.

A processor or processor core, as used herein may include all the instances of central processing units (CPU's), microprocessors, microcontrollers (MCU), digital signal processors (DSP), application specific integrated circuits (ASIC), state machines, and the like, as the scenarios may apply.

Accordingly, a processor or processor core as described herein includes any device, system, or part thereof that controls at least one operation, and such a device may be implemented in hardware, firmware, or software, or some combination of at least two of the same. The functionality associated with any particular processor may be centralized or distributed, whether locally or remotely. A processor may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

A memory may comprise any combination of volatile and non-volatile computer-readable media for reading and writing. Volatile computer-readable media includes, for example, random access memory (RAM). Non-volatile computer-readable media includes, for example, any one or more of read only memory (ROM), magnetic media such as a hard-disk, an optical disk drive, a flash memory device, a CD-ROM, and the like. In some cases, a particular memory is separated virtually or physically into separate areas, such as a first memory, a second memory, a third memory, etc. In these cases, it is understood that the different divisions of memory may be in different devices or embodied in a single memory.

In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An unmanned vehicle, comprising:
a chassis;
a propelling module coupled to the chassis;
at least one moveable member coupled to the chassis through a support element and a flexible coupling element, the at least one moveable member being moveable to change a position of the propelling module relative to a movement path of the unmanned vehicle;
at least two wheels coupled to the chassis, each of the at least two wheels configured to freely rotate with respect to the chassis; and
a controller that, when in operation, controls a movement of the at least one moveable member.

2. The unmanned vehicle of claim 1, wherein the chassis and the propelling module are structured to be fixed with respect to one another to move as a whole relative to the movement path of the unmanned vehicle.

3. The unmanned vehicle of claim 1, wherein the flexible coupling element coupling the at least one moveable member through to the chassis is at least one hinge.

4. The unmanned vehicle of claim 1, wherein the at least one moveable member includes a first moveable member and a second moveable member, the first moveable member coupled to the chassis through a first hinge arranged in a first direction, the second moveable member coupled to the chassis through a second hinge arranged in a second different direction.

5. The unmanned vehicle of claim 4, wherein the first direction and the second direction are substantially perpendicular to one another.

6. The unmanned vehicle of claim 3, wherein the at least one hinge is an elastic hinge.

7. The unmanned vehicle of claim 1, wherein the at least two wheels are structured to float in a liquid medium.

8. The unmanned vehicle of claim 7, wherein the at least two wheels each includes at least one of a low-density material or an inner tube.

9. The unmanned vehicle of claim 1, further comprising one or more sensors that detect an operational environment of the unmanned vehicle.

10. The unmanned vehicle of claim 1, further comprising a pay load module coupled to the chassis, the pay load module including a communication interface capable of coupling to the controller.

11. The unmanned vehicle of claim 1, wherein the propelling module includes a motor, a shaft and a propeller, the shaft being substantially perpendicular to an axis between two wheels of the at least two wheels.

12. An unmanned vehicle, comprising:
a chassis;
a propelling module rigidly coupled to the chassis in a fixed relationship, the propelling module including a motor, a shaft and a propeller;
at least two aileron members coupled to the chassis through a support member and a flexible coupling element, each aileron member being configured to change air flux thereabout through tilting;
a rotatable connecting member between the chassis and the aileron members that permit the entire chassis to rotate when the air flux changes as the ailerons tilt; and
a controller that in operation controls the tilting of the aileron member.

13. The unmanned vehicle of claim 12, wherein the chassis includes a frame arranged outside the propelling module, and an aileron member of the at least two aileron members is coupled to the frame.

14. The unmanned vehicle of claim 12, wherein an aileron member of the at least two aileron members is coupled to the chassis through the support element and the flexible coupling element, the support element configured to rotate about a longitudinal axis thereof.

15. A method of operating an unmanned vehicle, comprising:
detecting, by a sensor, an operation environment of the unmanned vehicle travelling in a first path, the unmanned vehicle including a propelling module and multiple aileron members coupled to the propelling module through a support member and a flexible coupling member;

selecting an operation state of the unmanned vehicle based on the detected operation environment; and tilting one or more of the multiple aileron members to change a position of the propelling module relative to the first path based on the selected operation state.

16. The method of claim 15, further comprising controlling a rotation speed of a propeller of the propelling module.

17. The method of claim 15, wherein the selecting the operation state of the unmanned vehicle includes selecting a ground travelling mode over a flying mode and a floating mode as long as the detected operation environment allows.

18. The method of claim 17, wherein the tilting the one or more of the multiple aileron members including maintaining the propelling module to stay in a position for ground traveling based on that the detected operation environment is suitable for ground travelling.

19. The method of claim 16, wherein the controlling a rotation speed of the propeller is based on the detected operation environment.

20. The method of claim 15, wherein the detecting the operation environment includes detecting an obstacle on the first path of the unmanned vehicle.

* * * * *